US005842076A

United States Patent [19]

Glover et al.

[11] Patent Number: 5,842,076

[45] Date of Patent: Nov. 24, 1998

[54] APPARATUS FOR SUPPLYING A LIQUID FROM A CONTAINER

[75] Inventors: Edward C. Glover, London; Anthony Earle, Harrow Weald, both of United Kingdom

[73] Assignee: Eastman Kodak Company, Rochester, N.Y.

[21] Appl. No.: 897,994

[22] Filed: Jul. 25, 1997

[30] Foreign Application Priority Data

Aug. 8, 1996 [GB] United Kingdom .................. 9616691

[51] Int. Cl.$^6$ .............................. G03D 3/06; G01F 11/00

[52] U.S. Cl. ........................ 396/626; 222/464.1; 222/522

[58] Field of Search .................................. 396/625, 626, 396/627, 628, 630, 631, 641; 222/211, 464.5, 464.3, 464.1, 522, 525; 141/375, 374

[56] References Cited

U.S. PATENT DOCUMENTS 2,989,911 6/1961 Winnek .................................. 396/626
3,698,454 10/1972 Cunha et al. .......................... 141/375
4,533,225 8/1985 Shiga .................................... 396/622
4,586,805 5/1986 Blockemuhl-Simon et al. ...... 396/635
5,652,937 7/1997 Earle et al. ............................ 396/626

FOREIGN PATENT DOCUMENTS 346 655 C 2/1920 Germany .
810 688 3/1959 United Kingdom .
1382129 1/1975 United Kingdom .

*Primary Examiner*—A. A. Mathews
*Attorney, Agent, or Firm*—Frank Pincelli

[57] ABSTRACT

An apparatus for supplying a liquid from a container which has an opening through which the liquid can be removed. The apparatus comprises a lid for the opening in the container, an aperture in the lid through which a tube projects for access to the interior of the container, a liquid-tight seal in the aperture through which the tube passes, with the tube being movable through the seal, at least one opening in the wall of the tube adjacent the end of the tube having access to the interior of the container, a closure arrangement at the end of the tube preventing the passage of liquid through the end of the tube into the container, and an arrangement for preventing the withdrawal of the end of the tube through the aperture in the lid. When the tube has been withdrawn through the seal until prevented from further withdrawal, said opening in the wall of the tube is closed by the seal.

7 Claims, 1 Drawing Sheet

APPARATUS FOR SUPPLYING A LIQUID FROM A CONTAINER

FIELD OF THE INVENTION

The invention relates to an apparatus for supplying a liquid from a container.

BACKGROUND OF THE INVENTION

Many types of processing apparatuses require a liquid to be drawn from a container for use in the process. For example, a photoprocessing apparatus may require one or more solutions for developing, fixing, bleaching and washing to be supplied from a container to the appropriate processing stage in the apparatus.

Typically, the container has an opening provided with a lid through which the liquid can be removed from the container. A tube from the apparatus projects through an aperture in the lid into the interior of the container. The tube may be connected to a pump which pumps liquid out of the container to the desired processing stage.

When a container has been emptied, the lid and tube are removed and the container is replaced with a new full container. Various ways have been devised of preventing leakage of liquid from the tube and lid as they are removed.

GB-A-1 382 129 describes the use of a lid in the form of an access unit having an aperture through which an access tube projects into the container. The aperture has a liquid-tight seal through which the tube passes, the tube being movable through the seal. The tube has at least one aperture in its wall adjacent the end of the tube in the container. The end of the tube is provided with sealing means e.g. a conical plug to seal off the aperture in the access unit when the sealing means contacts the access unit.

When the container is empty, the access tube is retracted through the access unit until the sealing means contacts the access unit thereby preventing leakage through the bottom of the unit. During retraction of the tube, liquid is wiped from the surface of the tube as it passes through the liquid-tight seal which prevents leakage through the top of the unit.

A device which is simpler than the access unit is desired to prevent leakage during the changing of containers.

SUMMARY OF THE INVENTION

The invention provides an apparatus for supplying a liquid from a container which has an opening through which the liquid can be removed, said apparatus comprising a lid for the opening in the container, an aperture in the lid through which a tube projects for access to the interior of the container, a liquid-tight seal in the aperture through which the tube passes, said tube being movable through the seal, at least one opening in the wall of the tube adjacent the end of the tube having access to the interior of the container, closure means at said end of the tube preventing the passage of liquid through the end of the tube into the container, and means for preventing the withdrawal of said end of the tube through the aperture in the lid, when the tube has been withdrawn through said seal until prevented from further withdrawal, said opening in the wall of the tube is closed by said seal.

The apparatus is significantly less complicated than the prior art apparatus.

The opening(s) in the wall of the tube can be nearer the end of the tube than in the prior art arrangement, making it possible to remove more liquid from the container.

The lid is able to rotate around the tube without twisting the tube which is desirable, for example, when the lid is to be screwed onto a container.

DETAILED DESCRIPTION OF THE INVENTION

The apparatus of the invention may be used with any type of container e.g. a bottle which has an opening through which liquid in the container can be removed. In a preferred embodiment, both the container opening and the lid are threaded so that the lid can be screwed onto the container.

The lid is provided with an aperture through which a tube projects for access to the interior of the container. Preferably, the tube is flexible.

The tube passes through a liquid-tight seal in the aperture and is movable through the seal. The seal may comprise a sleeve of resilient material e.g. rubber surrounding the tube. Alternatively, the seal may comprise two O-ring seals.

The tube has at least one opening in its wall adjacent the end of the tube having access to the interior of the container.

Closure means at the end of the tube prevents the passage of liquid through the end of the tube into the container. The closure means may comprise a cap covering the end of the tube.

Means for preventing the withdrawal of the end of the tube through the aperture in the lid is provided. For example, the end of the tube may comprise a projection.

In a preferred embodiment, the closure means comprises a cap covering the end of the tube which cap extends laterally beyond the outer surface of the tube thereby preventing the withdrawal of the end of the tube through the aperture in the lid.

The position of the opening in the wall of the tube and the position of the seal in the aperture in the lid are such that when the tube has been withdrawn through said seal until prevented from further withdrawal, the opening in the wall of the tube is closed by the seal.

In a preferred embodiment, a handle is attached to the tube to facilitate moving the tube through the seal. Preferably, the handle is positioned on the tube such that when the handle is in contact with the lid, the end of the tube extends sufficiently through the lid to be adjacent or touching the bottom of the container when the apparatus is in use.

The invention also provides a processing apparatus for processing photosensitive material e.g. photographic film or paper, the apparatus comprising at least one processing tank;

at least one container connected to a respective one of the processing tanks; and, means for supplying processing solution from the container to the processing tank, said means comprising an apparatus in accordance with the invention.

Preferably, the apparatus further comprises pumping means for pumping processing solution from the container to the processing tank.

The invention is further described by way of example with reference to and as illustrated in the accompanying Figures.

Figure 1:
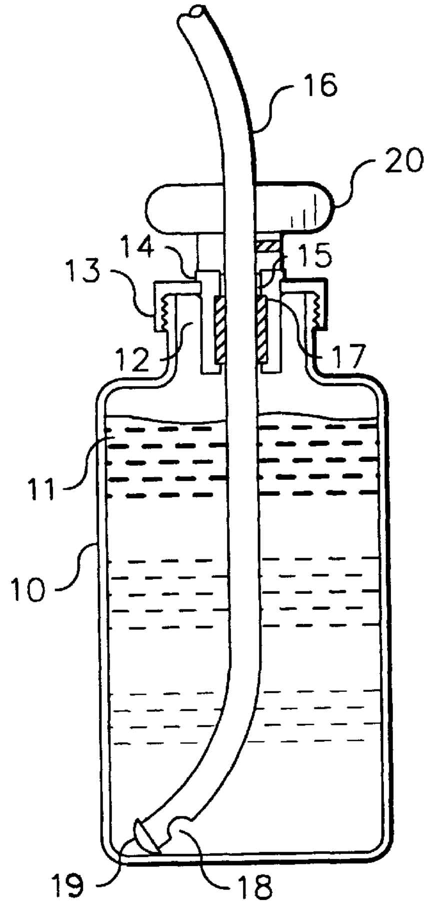
FIG. 1 is a schematic representation of an apparatus in accordance with the invention attached to a container full of liquid.

In FIG. 1, a container 10 is full of liquid 11. The container has an opening 12 through which the liquid can be removed. A lid 13 covers the opening 12. Both the container opening 12 and the lid 13 are threaded, the lid 13 being screwed onto the container 10.

The lid 13 comprises a central plug 14 which defines an aperture 15 through which a tube 16 projects into the interior of the container 10. A liquid-tight seal in the form of a rubber sleeve 17 is provided in the aperture 15 through which the tube 16 passes. The lid 13 further comprises a small hole (not shown) for allowing air to enter the container as liquid is removed.

The end of the tube 16 in the container 10 has an opening 18 in its wall adjacent the end of the tube 16. Closure means in the form of a cap 19 is provided at the end of the tube 16. The cap 19 extends laterally beyond the outer surface of the tube 16 thereby preventing the withdrawal of the end of the tube 16 through the aperture 15.

The other end of the tube (not shown) is connected to the processing apparatus e.g. to a pump for pumping the liquid to the desired processing stage.

A handle 20 is attached to the tube 16. The handle 20 is positioned so that it is in contact with the lid 13 when the end of the tube 16 is at the bottom of the container 10.

Figure 2:
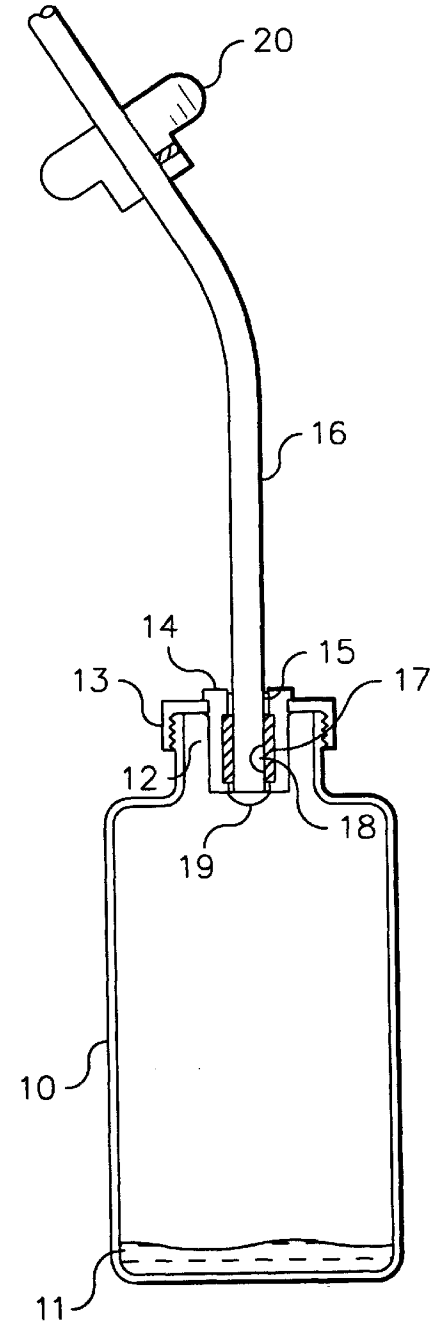
FIG. 2 is a schematic representation of the apparatus in accordance with the invention attached to a substantially empty container.

FIG. 2 shows the apparatus of FIG. 1 when the container 10 has been emptied and the tube 16 has been withdrawn through seal 17 until prevented from further withdrawal by the cap 19 coming into contact with the underside of the plug 14. The opening 18 in the wall of the tube 16 is closed by the seal 17.

In operation, liquid is drawn as required from the container 10 in FIG. 1 until the container 10 has been emptied. Handle 20 is used to withdraw the tube 16 through the lid 13 until the cap 19 at the end of the tube 16 prevents further withdrawal. The lid 13 is then unscrewed and the empty container 10 removed. Because the opening 18 in the tube 16 is closed by the seal 17 in the lid 13, no liquid can leak from the lid 13.

A screw lid without any opening may be fitted to the empty container to prevent spillage of any liquid remaining in the container. The lid 13 is then fitted to a new container 10 full of liquid. Handle 20 is used to push the tube 16 into the new container 10. When the handle 20 contacts the top of the lid 13, the end of the tube 16 is in the correct position at the bottom of the container 10.

Figure 3:
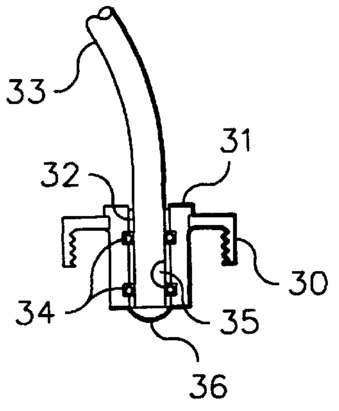
FIG. 3 is a schematic representation of an apparatus in accordance with the invention having an alternative liquid-tight seal.

FIG. 3 shows an alternative arrangement for sealing the tube when it is withdrawn through the lid. The lid 30 comprises a central plug 31 which defines an aperture 32 through which a tube 33 passes. A liquid-tight seal in the form of two O-rings 34 spaced apart is provided in the aperture 32 through which the tube 33 passes.

The end of the tube 33 has an opening 35 in its wall adjacent the end of the tube 33. Closure means in the form of a cap 36 is provided at the end of the tube 33. The cap 36 extends laterally beyond the outer surface of the tube 33 thereby preventing the withdrawal of the end of the tube 33 through the aperture 32.

The tube 33 is shown fully retracted through the lid 30. In this position, the opening 35 in the tube 33 is closed by the seal 34 so that any liquid leaving the opening 35 cannot leak from the lid 30.

The invention has been described in detail with particular reference to certain preferred embodiments thereof, but it will be understood that variations and modifications can be effected within the spirit and scope of the invention.

PARTS LIST

10 container
11 liquid
12 opening
13 lid
14 plug
15 aperture
16 tube
17 rubber sleeve
18 opening
19 cap
20 handle
30 lid
31 plug
32 aperture
33 tube
34 two O-rings
35 opening
36 cap

What is claimed is:

1. An apparatus for supplying a liquid from a container which has an opening through which the liquid can be removed, said apparatus comprising:

a lid for the opening in the container;

an aperture in said lid through which a tube projects for access to an interior of the container, said tube being movable through said lid and having a distal end which is disposed at the bottom of said container;

a liquid-tight seal in said aperture through which the tube passes, said tube being movable through said seal;

at least one opening in a wall of the tube adjacent to said distal end of the tube and having access to the interior of the container;

closure means at the end of the tube preventing a passage of liquid through the distal end of the tube into the container; and means for preventing a withdrawal of the end of the tube through the aperture in the lid when said tube is retracted;

wherein, when the tube has been withdrawn through said seal until prevented from further withdrawal, said opening in the wall of the tube is closed by said seal.

2. Apparatus according to claim 1, wherein the seal comprises a sleeve of resilient material surrounding the tube.

3. Apparatus according to claim 1, wherein the seal comprises two O-ring seals surrounding the tube.

4. Apparatus according to claim 1, wherein the lid is threaded for attachment to the container.

5. Apparatus according to claim 1, wherein the closure means comprises a cap covering the end of the tube which cap extends laterally beyond an outer surface of the tube thereby preventing the withdrawal of the end of the tube through the aperture in the lid.

6. Apparatus according to claim 1, wherein a handle is attached to the tube to facilitate moving the tube through the seal.

7. A processing apparatus for processing photosensitive material comprising:

at least one processing tank;

at least one container connected to a respective one of the processing tanks; and, means for supplying processing solution from the container to the processing tank, said means comprising a dispensing apparatus for supplying a liquid from a container which has an opening through which the liquid can be removed, said dispensing apparatus comprising:

a lid for the opening in the container;

an aperture in said lid through which a tube projects for access to an interior of the container, said tube being movable through said lid and having a distal end which is disposed at the bottom of said container;

a liquid-tight seal in said aperture through which the tube passes, said tube being movable through said seal;

at least one opening in a wall of the tube adjacent to said distal end of the tube and having access to the interior of the container;

closure means at the end of the tube preventing a passage of liquid through the distal end of the tube into the container; and means for preventing a withdrawal of the end of the tube through the aperture in the lid when said tube is retracted;

wherein, when the tube has been withdrawn through said seal until prevented from further withdrawal, said opening in the wall of the tube is closed by said seal.

* * * * *